United States Patent [19]
Marouby

[11] 3,832,011
[45] Aug. 27, 1974

[54] ANTI-SLIP OR ADAPTIVE BRAKING SYSTEM

[75] Inventor: Guy Marouby, Neuilly, France

[73] Assignee: Societe Anonyme D.B.A., Paris, France

[22] Filed: Jan. 5, 1973

[21] Appl. No.: 321,494

[30] Foreign Application Priority Data
Dec. 29, 1971   France .............................. 71.47229

[52] U.S. Cl.............. 303/21 P, 303/20, 303/21 CG
[51] Int. Cl............................................... B60t 8/12
[58] Field of Search ................ 188/181; 303/20, 21; 324/161–162; 340/53, 262, 263

[56] References Cited
UNITED STATES PATENTS

| | | | |
|---|---|---|---|
| 3,499,689 | 3/1970 | Carp et al. | 303/21 P |
| 3,519,313 | 7/1970 | French et al. | 303/21 BE |
| 3,637,264 | 1/1972 | Leiber et al. | 303/21 BE |
| 3,674,320 | 7/1972 | Howard et al. | 303/21 P |
| 3,698,772 | 10/1972 | Nixon | 303/21 BE |
| 3,704,043 | 11/1972 | Hickner et al. | 303/21 BE |

*Primary Examiner*—Trygve M. Blix
*Assistant Examiner*—Stephen G. Kunin
*Attorney, Agent, or Firm*—Ken C. Decker; William N. Antonis

[57] ABSTRACT

An adaptive braking system for a set of vehicle wheels, of the type comprising a fluid pressure source, braking apparatus associated with the set of wheels, and control apparatus for controlling the fluid pressure acting on the braking apparatus. The fluid pressure supplied to the braking apparatus is automatically controlled by the control apparatus in successive stages of pressure increase and pressure decrease separated from one another by intervals during which the pressure is kept constant. More particulary, a stage of pressure increase is controlled after an interval whenever the deceleration of a wheel has been decreasing or has remained constant during this interval, and a stage of pressure decrease whenever the deceleration has been increasing during the interval.

8 Claims, 3 Drawing Figures

# ANTI-SLIP OR ADAPTIVE BRAKING SYSTEM

BACKGROUND OF THE INVENTION

Conventionally, an adaptive braking system for a set of vehicle wheels comprises a fluid pressure source, braking means associated with the set of wheels, and means for controlling the fluid pressure acting on the braking means.

In adaptive braking systems of this type control means produce successive increasing or decreasing variations in the braking pressure at the instants when one of the wheels in the set of whe wheels goes through deceleration and/or acceleration thresholds values which may be either fixed or variable as a function of the speed of the wheel. In other systems of the same type, these variations are produced by a control system which maintains the slip of this wheel or of the set of wheels at a predetermined value. Lastly, other braking systems of this type vary the braking pressure on each side of an average value which may be adjustable, the maximum braking pressure admissible without locking being determined by measuring the acceleration of the wheel during a period in which the braking pressure is decreasing.

All these known braking systems have disadvantages. Selecting deceleration and/or acceleration threshold value whether fixed or variable, to initiate the variations in braking pressure does not guarantee that the wheel slip will be maintained at its optimum value, at which there is maximum adhesion between the wheel and the ground. On the other hand, making the wheel slip dependent on a predetermined value does not guarantee that the predetermined slip will coincide with the optimum slip irrespective of the wheel/ground adhesion conditions. Lastly, varying the braking pressure on each side of an average value involves delays in operation and loss of efficiency, particularly due to the periodic reductions in braking pressure required for the purpose of measuring the wheel acceleration during these reductions.

SUMMARY OF THE INVENTION

According to the invention, a braking system of the type referred to is characterized in that the control means exert the braking pressure automatically in successive stages of increase or decrease separated from one another by intervals during which the braking pressure is kept constant.

Advantageously, the control means produce a stage of pressure increase after an interval whenever the deceleration of a wheel in the set of wheels has been decreasing or has been constant during this interval, and a stage of pressure decrease whenever the said deceleration has been increasing during the interval.

In a preferred embodiment of the invention, the unit duration of the stages of increase or decrease is at most equal to a first predetermined duration, and the unit duration of the intervals is constant and equal to a second predetermined duration, and the control means comprise: time-base forming means delivering a train of time-base signals of unit duration equal to the first predetermined duration, separated from one another by the intervals; detection means responsive to the increase and decrease in deceleration of the wheel and delivering a detection signal when the deceleration is increasing; comparison means operated by the time-base signals and by the detection signal and delivering a comparison signal as soon as the detection signal is still being delivered after a third predetermined duration, shorter than the second predetermined duration and counted from the trailing edge of each time-base signal, until the detection signal ends; admission means operated by the time base signals and by the comparison signal, these means connecting the pressure fluid source to the brake actuating means for the duration of the time-base signals while the comparison signal is absent, and disconnecting the source from the brake actuating means during the intervals and while the comparison signal is present; release initiating means operated by the time-base signals and by the comparison signal and delivering a pressure release signal when the time signals and comparison signal are present simultaneously; and pressure release means operated by the pressure signal and permitting, for the duration of this signal, release of the fluid pressure acting on the braking means.

Other features will be apparent to those skilled in the art from reading this specification.

DETAILED DESCRIPTION OF THE PREFERRED EMBODIMENT

Figure 1:
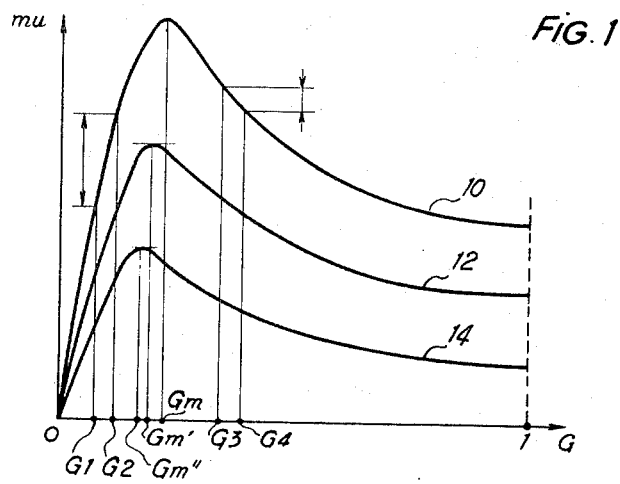
FIG. 1 represents a family of curves illustrating the variations in the coefficient of adhesion "mu" as a function of the slip G.

FIG. 1 shows curves for typical variations in the coefficient "mu" of adhesion between a wheel and the ground as a function of the slip G of this wheel relative to the ground, for different states of the ground surface. Curve 10, for example, is for a dry concrete surface, curve 12 for a wet concrete surface, and curve 14 for a concrete surface covered with packed snow. It is well known that these different curves 10, 12 and 14 share the property of having a peak corresponding to a maximum coefficient of adhesion "mu," for slips G indicated respectively by references Gm, Gm' and Gm''. It is also known that the values of these slips Gm, Gm' and Gm''.may vary continuously between about 0.1 and 0.25 FIG. 1 shows, moreover, that the maximum adhesion coefficients, in the different cases are by no means equal; it is found in practice that the maximum adhesion coefficient may vary between about 0,1 and 0,8. The only property of these adhesion/slip curves which is found under widely different conditions, therefore, is that the adhesion curves show a maximum at a certain slip value.

Referring now to curve 10, for example, it will be found that for two intervals G1, G2 and G3, G4 on opposite sides of the peak Gm of this curve, the dynamic properties of the wheel are completely different.

During the first interval G1 – G2, an increase in slip (from G1 to G2) corresponds to an increase in the adhesion coefficient "mu." In other words, the wheel is in stable equilibrium on the rising portion of the curve 10. Conversely, during the interval G3 – G4, an increase in slip (from G3 to G4) corresponds to a reduction in the adhesion coefficient "mu," or in other words, the wheel is not in stable equilibrium at all on the falling portion of the curve 10, since if a constant braking force is applied to it the wheel tends to lock, and locking corresponds to the point at which slip is equal to one.

This amounts to saying that on the rising portion of the curve 10 the dynamics of the wheel are such that during a plateau in the braking pressure, during which this pressure is kept constant and which follows a rapid increase in this pressure, the deceleration of the wheel decreases. Conversely, on the falling portion of the curve 10, the deceleration of the wheel during a similar plateau increases. As a result it is possible to determine in each case the slip value corresponding to the maximum coefficient of adhesion "mu" by detecting the direction in which the wheel deceleration varies during a plateau of constant braking pressure, whatever the conditions at the wheel/ground interface and whatever the speed of the wheel.

Figure 2:
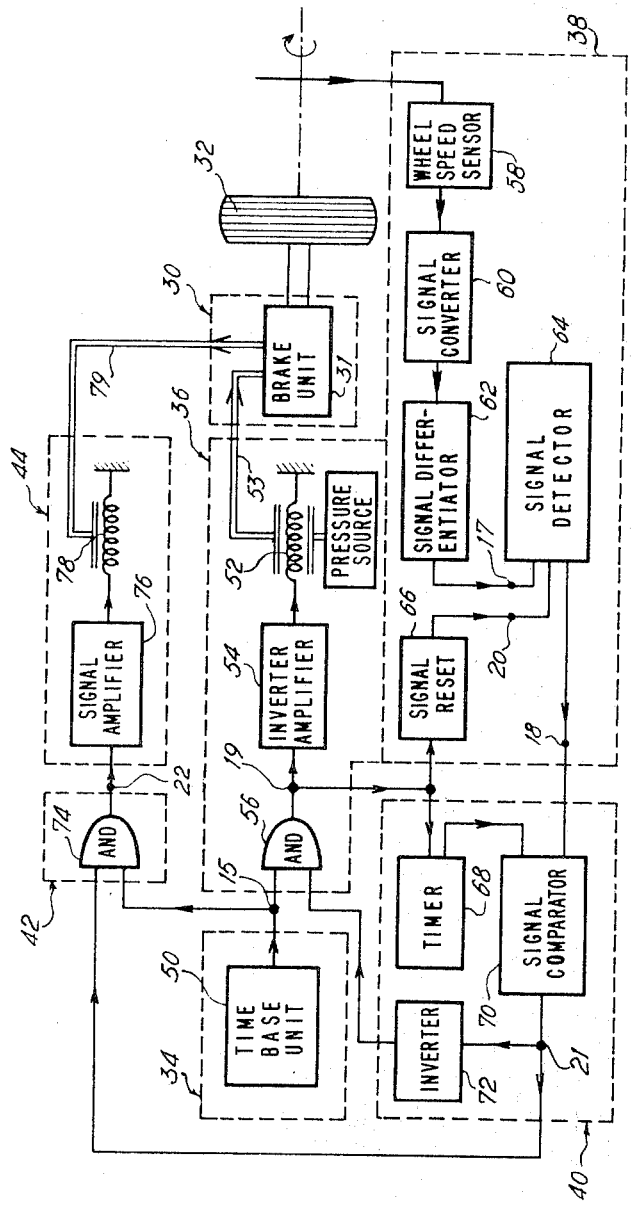
FIG. 2 represents an adaptive braking system embodying the invention.

An embodiment of an adaptive braking system based on the principles set out above is illustrated in FIG. 2.

FIG. 2 represents an adaptive braking system in which, for clarity's sake, broken lines surround element units fulfilling a given function in the braking system. The first of these units, designated 30, comprises braking means acting on a wheel 32. A unit 34 comprises time base forming means, a unit 36 comprises admission means for admitting the braking pressure acting on the unit 30, a unit 38 comprises detection means responsive to the increase and decrease in deceleration of the wheel 32, a unit 40 comprises comparison means, a unit 42 comprises pressure- release initiating means, and lastly a unit 44 comprises release means permitting relaxation of the braking pressure acting on the unit 30.

Figure 3:
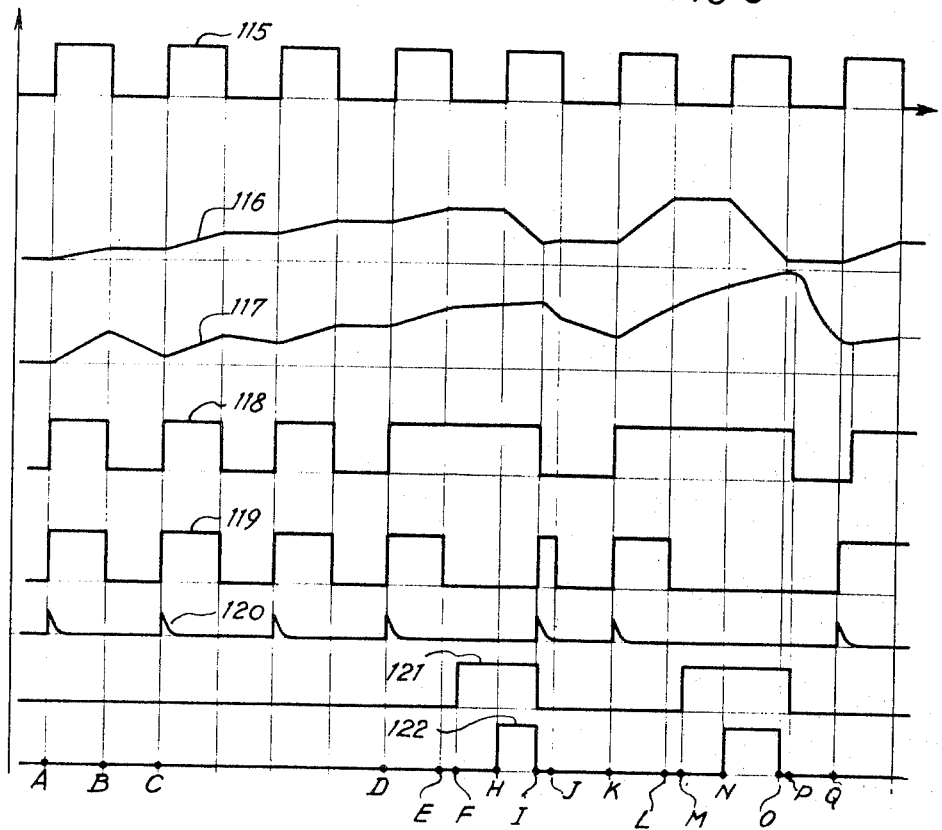
FIG. 3 represents variations with time in various quantities relating to elements of the braking system shown in FIG. 2.

The unit 30 comprises conventional braking means 31 acting on the wheel 32 and connected by means of ducts 53, 79 to the admission unit 36 and release unit 44 respectively. The unit 34 comprises a conventional time base 50 supplying time-base signals to a point 15, these signals being designated 115 in FIG. 3. As shown in FIG. 3, these time signals are conventional signals with a suitable repetition period. The admission unit 36 comprises an AND gate 56 with two inputs, the first of which receives the time-base signals 115 supplied to the point 15. This AND gate 56 delivers to a point 19 output signals which are fed to an inverter amplifier 54, whose output signals supply the winding of a solenoid valve 52 connected by the admission duct 53 to the braking means 31.

The detection unit 38 comprises a conventional sensor 58 which supplies a converter 60 with a signal whose frequency is proportional to the speed of rotation of the wheel 32. This converter 60, which is of a known type, feeds to a differentiator circuit 62 a signal of constant polarity whose level is proportional to the speed of rotation of the wheel 32. This differentiator circuit 62 in turn supplies to a point 17 a signal 117 (FIG. 3) whose value is proportional to the deceleration of the wheel 32. Lastly a detector circuit 64 receives at one of its two inputs the signal 117 appearing at the point 17. This detector circuit 64, which may be of any known type, particularly that described in U.S. Pat. No. 3,666,326 issued May 30, 1972 in the name of Guy Marouby, supplies to a point 18 a signal 118 (FIG. 3) which is positive when the signal 117 appearing at the point 17 is increasing and which is zero otherwise.

A zero resetting circuit 66, whose input is connected to the point 19 and whose output supplies the second input 20 of the detector circuit 64, supplies zero resetting signals 120 (FIGS. 3) for the detector circuit 64. This zero resetting circuit 66 may be of any known type, for example that described in the above-mentioned U.S. Patent.

The comparison unit 40 comprises a timing-circuit 68 whose input is connected to the point 19 and whose output is connected to one input of a comparator circuit bistable inhibition 70, whose other input is connected to the point 18. The timing circuit 68, which is of a conventional type, provides at its output a train of modified base signals of which the leading edge is synchronous with the leading edge of each of the time-base signals 115 and the trailing edge is delayed relative to the trailing edge of each of these time-base signals by a predetermined duration, this predetermined duration being less than the duration separating the end of any time-base signal from the beginning of the time -base signal following it. The comparator circuit 70, also of conventional type, supplies a comparison signal 121 at a point 21 when a signal is present at the point 18, as soon as the output signal from the timing circuit 68 ends, this comparison signal then continuing to be supplied until the detection signal 118 ends in turn. Lastly, the comparison unit 40 comprises an inverter 72 whose input is connected to the point 21 and whose output is connected to the second input of the AND gate 56. This inverter 72 therefore feeds this second input of the AND gate 56 with a signal opposite to the comparison signal, that is, a signal which is zero if the output signal at the point 21 is not zero, and vice versa.

The pressure release initiating unit 42 comprises an AND gate 74, of which one input is connected to the point 15 and the other to the point 21. This AND gate 74 therefore receives both the time-base signals and the comparison signal. Lastly, the release unit 44 comprises an amplifier 76 receiving the output signals (appearing at a point 22) from the AND gate 74, and a release solenoid valve 78 whose winding is energized by the output signals from the amplifier 76 and which is connected by the release duct 79 to the braking means 31.

The solenoid valve 52 is normally open and closes when the inverter amplifier 54 sends it an energizing signal, whereas the solenoid valve 78 is normally closed and does not open except when the amplifier 76 sends it an energizing signal.

In FIG. 3 the curve 115 represents the time-base signal applied to the point 15 as mentioned above. The curve 116 represents the variations in the braking pressure in the braking means 31. The curve 117 represents the variations in the voltage at the point 17, that is to say, the variations in the deceleration of the wheel 32, as stated above. The curve 118 represents the variations in the output signal from the detector circuit 46 at the point 18, that is, the signal detecting an increase in the signal 117. The curve 119 represents the variations in the output signal from the AND 56 (at the point 19), that is in the admission signal. The curve 120 represents the variations in the output signal from the zero resetting circuit 66, at the point 20. The curve 121 represents the variations in the comparison signal at the output from the comparator circuit 70, at the point 21.

Lastly, the curve 122 represents the variations in the output signal from the AND gate 74 at the point 22, that is, the release signal.

The braking system described above operates as follows.

During a braking phase, and following intervention by the driver, the time base 50 supplies the time-base signals 115 at the point 15. Assuming that the wheel 32 is braked little at first between the instants A and D in FIG. 3, the output signal from the inverter 72 is normally positive and the AND gate 56 therefore provides at the point 19 a signal 119 synchronous with the time-base signal appearing at the point 15. This signal 119, which constitutes the admission signal, is amplified and inverted by the inverter amplifier 54 and operates the winding of the solenoid valve 52, so that a braking pressure such as that represented by the reference 116 in FIG. 3 is admitted to the brake actuating means 31 by way of the duct 53 from a pressure fluid source (not shown). This braking pressure is therefore, between the instants A and D, a succession of increasing ramps separated by intervals during which the pressure is kept constant.

The deceleration signal 117 which is supplied at the point 17 by the differentiator circuit 62 between the instants A and D increases during periods of increase in the braking pressure and decreases, or is at most constant, during the braking-pressure plateaus. During the interval A – D, therefore, the wheel 32 finds itself in motion conditions corresponding to the rising portion of the curve 10 in FIG. 1. The detector circuit 64 provides a positive signal during periods of increase in the deceleration signal 117, as FIG. 3 shows. The zero resetting circuit 66, which provides a zero resetting pulse whenever the admission signal 119 produces a rising edge, is intended to reset the detector circuit 64 to zero, as explained in detail in the above-mentioned U.S.-Patent.

Still between the points A and D, no signal is generated by the comparator circuit 70, since the duration of each detection signal 118 is less than or equal to the duration of each modified base signal from the timing-circuit 68. The AND gate 74 is therefore blocked, and the release solenoid valve 78 remains closed.

However, let us assume that at the instant E the wheel has reached and passed slightly beyond the point Gm in FIG. 1. During the plateau EH at which the braking pressure is constant, the deceleration of the wheel continues to increase since the coefficient of adhesion between this wheel and the ground diminishes. As a result the detection signal 118, which had appeared normally at the instant D, is maintained and continues to be delivered after the admission signal 119 ends at the instant E. A comparison signal 121 is therefore generated at the point 21 by the comparator circuit 70 from an instant F, which succeeds the instant E by the predetermined duration imposed by the timing-circuit 68. At the instant H, therefore a release signal 112 appears at the point 22 downstream of the AND gate 74, because the comparison signal 121 is present at the same time as the time-base signal 115 appears. The amplifier 76 immediately amplifies this release signal and energizes the solenoid of the release valve 78, so as to relax the pressure acting on the braking means 31. Simultaneously the inverter 72, receiving a positive signal at its input, feeds a zero signal to the second input of the AND gate 56, so preventing the time-base signals from being transmitted to the point 19 and precluding therefore the re-admission of pressure by the admission valve 52.

The braking pressure therefore begins to decrease from the instant H to a certain instant I, corresponding to the instant at which the deceleration signal 117 begins to decrease again, following this reduction in the braking pressure. At this instant I the detection signal 118 disappears, as do the comparison signal 121 and release signal 122, whereas a positive signal appears at the second input of the AND gate 56, therefore pressure is admitted during the interval I-J by means of the admission valve 52. The antiskid cycle may be repeated from this instant J, as illustrated in FIG. 3.

Clearly, during the interval J-K, the pressure is constant, the deceleration is decreasing, the detection signal is zero, the admission signal is also zero, and the comparison and release signals have therefore not appeared. During the interval K-L, the braking pressure is increasing, the wheel deceleration is also increasing, and the detection signal therefore appears. From the point L the wheel deceleration is continuing to increase and therefore the detection signal 118 is maintained, the comparison signal appears at the instant M delayed relative to the instant L by a delay equal to the duration E – F produced by the timing circuit 68, and the release signal 122 reappears at the instant N, when a time-base signal 115 is present. If the deceleration signal 117 begins to decrease again, for example, at an instant P after the trailing edge 0 of this last time-base signal 115 has passed, the release signal is supplied throughout this time-base signal, between the instants N and O. The braking pressure therefore decreases throughout this interval N – 0, and only at the instant P, when the detection signal ends, does the comparison signal 121 disappear. This second example of operation, between the instants J and P, has been given only in order to illustrate how an adaptive braking circuit embodying the invention operates if, at a given instant, in this case the instant J, the driver exerts a braking pressure considerably higher than that which he was exerting earlier.

The timing circuit 68 serves to supply the comparison circuit 70 with modified time-base signals of which the unit duration exceeds that of the time-base signal 115 by a certain quantity, indicated in FIG. 3 by the timing intervals E – F and L – M. According to a feature of the invention, this timing interval is at least equal to the sum of the response times of the inverter amplifier 54, solenoid valve 52, braking means 31, ducts 53 and 59 and entire detection unit 38. This interval E – F, by making the system independent of these delays in operation, ensures that the wheel 32 actually enters a phase of increasing deceleration before any relaxation of the baking pressure is initiated.

Lastly, for example by suitable switching means (not shown), the operation of the solenoid valves 52, 78 and therefore the initiation of an adaptive braking phase may be prevented from taking place before the braking pressure exceeds a predetermined value, and/or the wheel deceleration passes a predetermined threshold, in order to ensure a fast enough initial pressure rise by momentarily keeping the adaptive braking system inoperative during all or part of each braking operation.

I claim:

1. An adaptive braking system for a set of vehicle wheels, of the type comprising a pressure fluid source, braking means associated with the set of wheels, and means for controlling the fluid pressure acting on the brake actuating means and supplied by the source following intervention by an operator, the system being characterized in that the control means exert the braking pressure automatically in successive stages of increase or decrease separated from one another by intervals during which the braking pressure is kept constant; said control means comprising time-base forming means delivering a train of time-base signals of unit duration equal to the first predetermined duration, separated from one another by the intervals; detection means responsive to the increase and decrease in deceleration of the wheel and generating a detection signal when the deceleration is increasing; comparison means operated by the time-base signals and by the detection signal and generating a comparison signal if the detection signal is still being generated after a third predetermined duration, said third predetermined duration being shorter than the second predetermined duration, and beginning at the trailing edge of each time-base signal, said comparison signal terminating when the detection signal ends; admission means operated by the time-base signals and by the comparison signal, these means connecting the pressure fluid source to the brake actuating means for the duration of the time-base signals while the comparison signal is absent, and disconnecting the source from the brake actuating means during the intervals and while the comparison signal is present; pressure-release initiating means operated by the time-base signals and by the comparison signal and delivering pressure-release signal when the time-base signals and comparison signal are present simultaneously; and release means operated by the release signal and permitting, for the duration of this signal, release of the fluid acting on the braking means.

2. A system as claimed in claim 1, characterized in that the admission means comprise a first, normally open solenoid valve which is energized into a closed position for the duration of the intervals and when the comparison signal is present.

3. A system as claimed in any of claim 1, characterized in that the detection means responsive to the increase and decrease in the deceleration comprise a speed sensor generating a signal whose frequency is proportional to the speed of the wheel, a converter circuit generating a speed signal whose value is proportional to the frequency, a differentiator circuit supplying a differentiated signal whose amplitude is proportional to the derivative with respect to time of the value of the speed signal, and a circuit responsive to the direction of variation of the negative portion of the amplitude of the differentiated signal and supplying the detection signal when the said negative portion is increasing.

4. A system as claimed in any of claim 1, characterized in that the comparison means comprise timing means operated by each time-base signal and supplying a train of modified time-base signals of which the leading edge is synchronous with the leading edge of the respective time-base signal but the trailing edge is delayed relative to the trailing edge of the respective time-base signal by the third predetermined duration, and bistable inhibition means operated by the modified time-base signals and by the detection signal and supplying the comparison signal for the duration of the detection signal except before the trailing edge of the current modified time-base signal.

5. A system as claimed in any of claim 1, characterized in that the third predetermined duration is at least equal to the sum of the response times of the admission means, brake actuating means and detection means.

6. A system as claimed in any of claim 1, characterized in that the release means comprise a second normally closed solenoid valve energized into an open position by the release signal.

7. In a vehicle having a wheel and brake means controlling said wheel, and adaptive braking system comprising:
    means for generating a first signal proportional to deceleration of said wheel;
    means responsive to said first signal for generating a second signal only when wheel deceleration increases and terminating said second signal when wheel deceleration does not increase;
    means for generating pulsating signals consisting of discrete pulses having a predetermined duration;
    means responsive to said second signal and to said pulsating signal for initiating generation of a third signal when said second signal and one of said discrete pulses are generated concurrently and terminating generation of said third signal only upon termination of said second signal;
    release valve means for controlling release of said brake means; and
    valve control means responsive to simultaneous generation of said pulsating signals and said third signal to actuate said release valve means.

8. The invention of claim 7;
    said pulsating signal generating means including timer means connected to the means generating said third signal, said timer means including means for modifying the duration of the pulses transmitted to the means generating said third signal so that the pulses transmitted to the latter are of a longer duration than are the pulses transmitted to said valve control means.

* * * * *